United States Patent [19]

Hirsch

[11] 4,282,797
[45] Aug. 11, 1981

[54] PROTECTIVE FLUID SYSTEM
[75] Inventor: Arthur E. Hirsch, Terre Haute, Ind.
[73] Assignee: J. I. Case Company, Racine, Wis.
[21] Appl. No.: 965,906
[22] Filed: Dec. 4, 1978

Related U.S. Application Data

[63] Continuation-in-part of Ser. No. 766,933, Feb. 9, 1977, abandoned.

[51] Int. Cl.³ .................. F01B 25/26; F15B 13/042
[52] U.S. Cl. ........................................ 91/1; 91/445; 91/447
[58] Field of Search ............ 91/1, 445, 447; 137/87, 137/498, 100

[56] References Cited

U.S. PATENT DOCUMENTS

| | | | |
|---|---|---|---|
| 2,497,032 | 2/1950 | Millard | 137/498 X |
| 2,964,016 | 12/1960 | Talak | 91/420 |
| 3,148,591 | 9/1954 | Sheesley | 91/1 |
| 3,519,010 | 7/1970 | Helling et al. | 137/100 |
| 3,587,393 | 6/1971 | Vick | 91/420 |
| 3,641,880 | 2/1972 | Honeycutt | 91/420 |
| 3,728,941 | 4/1973 | Cryder | 91/447 |
| 3,742,970 | 7/1973 | Gross | 137/100 |
| 4,063,489 | 12/1977 | Parquet et al. | 91/445 |

Primary Examiner—Irwin C. Cohen
Attorney, Agent, or Firm—Arthur J. Hansmann

[57] ABSTRACT

A protective fluid system having a fluid pump and a fluid control valve and a fluid protective valve and a fluid motor all connected together. The protective valve is responsive to a loss of pressure in a fluid line, such as when the line breaks, and the valve then closes to avoid the reaction of the fluid motor which may be a powered cylinder assembly under the influence of a load, and thus the load does not fall or otherwise move when the pressure is lost in the cylinder assembly.

14 Claims, 7 Drawing Figures

PROTECTIVE FLUID SYSTEM

This is a continuation-in-part of U.S. Pat. application Ser. No. 766,933 filed Feb. 9, 1977, PROTECTIVE FLUID SYSTEM, and now abandoned.

This invention relates to a protective fluid system, such as a hydraulic system which is protected against the movement of the hydraulic cylinder or the like if and when pressure is lost in the system, such as by the rupture of a fluid line.

BACKGROUND OF THE INVENTION

Industry is aware of the desire of protecting against the consequences of a rupture in a fluid line in a fluid system, especially where the load supported by the system is available for acting upon a system such as by falling or otherwise moving when the fluid pressure is lost in the system. One prior art example of a system which has apparatus useful for resisting a load in a lifted position when hydraulic pressure is lost is shown in U.S. Pat. No. 2,964,016.

The present invention provides an arrangement for protecting a hydraulic system against runaway operation in the event of inadvertent loss of hydraulic pressure, such as caused by the rupture of a hydraulic line. The present invention can also be utilized to stop leakage of fluid from the system, and, in the present instance, it operates by sensing fluid flow to and from a fluid motor or a powered cylinder assembly or the like. In the instance of employing a powered fluid cylinder in the fluid system, the flow of fluid to and from the opposite ends of the cylinder is in a fixed proportion therebetween. Accordingly, the present invention provides a protective valve which senses that flow, and if the flow is no longer in that fixed proportion, then the valve acts to block the flow from either end of the cylinder and to thereby avoid the escape of fluid from the system and to avoid the extension or contraction of the cylinder which is commonly subjected to the weight or effort of the load which the system is supporting.

Accordingly, the present invention provides a protective fluid system whereby the escape of fluid from a fluid motor, including a powered fluid cylinder assembly, can be checked so that the load supported by the system will not fall or move or otherwise act upon the system. That is, in the event a fluid line ruptures in the system, or in the event fluid pressure is otherwise sharply reduced in the fluid cylinder assembly, the system of this invention senses that change of fluid pressure and reacts to hold the fluid pressure in the cylinder assembly and to thereby prevent the load supported by the assembly from falling or the like.

In accomplishing the aforementioned objectives and achieving the purposes and advantages mentioned, the present invention does so with a system which incorporates a protective valve which is relatively simple and does not require any complicated working parts and is therefore a fully reliable valve and thus provides an effective and efficient protective system, for the purposes mentioned.

Still further, the present invention provides a fluid protective system which is versatile in its manner in which it protects the various elements and fluid lines in the system, and yet the particular protective valve incorporated in the system is of a reliable and relatively uncomplicated structure, and the protective valve is capable of being incorporated in the system in conjunction with a normally-utilized control valve which controls the flow of fluid to and from the several elements incorporated in the system, such as the fluid pump and the fluid motor or powered cylinder assembly. Further, the present system could incorporate a warning buzzer, light, or other signal which would indicate to the operator that the line has ruptured or that the system has otherwise experienced a rapid loss of fluid pressure.

Other objects and advantages will become apparent upon reading the following description in light of the accompanying drawings.

DETAILED DESCRIPTION OF THE PREFERRED EMBODIMENTS

Figure 1:
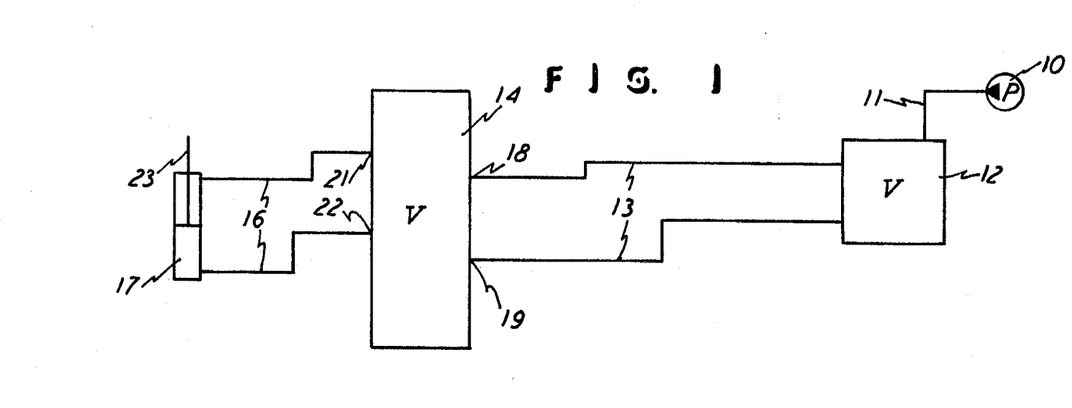
FIG. 1 is a diagrammatic view of one embodiment of a fluid system of this invention.

FIG. 1 shows one embodiment of the system which is shown to include the fluid pump 10, a connecting line of a hose or the like 11, a fluid control valve 12 and being of a conventional construction, fluid lines such as hoses 13, a protective fluid valve 14, fluid lines, such as hoses 16, and a fluid motor in the form of a fluid cylinder assembly 17. That is, the aforesaid elements are fluid-flow connected together by means of the fluid lines shown and in the arrangement which would be understandable by anyone skilled in the art. Thus the output of the pump 10 is directed to a control valve 12 where the operator can control the flow of fluid and thus the fluid pressure in the lines 13. The protective valve 14 is arranged in a manner hereinafter described and it functions to automatically respond to the fluid pressure directed thereto by means of the lines 13 and directed at the ports 18 and 19 and with regard to the outlet ports 21 and 22 which are in fluid-flow communication with the fluid line 16. Of course the operator is controlling the function of the fluid motor or powered fluid cylinder assembly 17, such as to have the element 17 support a load which is not shown but which may be acting on the element 17 to either contract the assembly 17 or to extend the assembly 17, such as by having the cylinder rod 23 extend or contract in response to the force or weight of the load on which the assembly 17 is acting. It is this effect of the load on the assembly 17 which is the reason for the protective valve 14, such that the valve 14 will respond in the event one of the lines 13 breaks and thus permits a loss of fluid pressure in the line 13. Thus, if pressure is lost in either line 13 when it is desired to have pressure therein, then the valve 14 will automatically respond and move to a closed position to thus hold pressure in the fluid cylinder assembly 17 and thereby preclude the movement of the assembly 17 and the falling or like action of the load supported by the assembly 17. As such, the entire system has the protective feature mentioned and for the reason of supporting the load against movement even though there is a rupture or failure in one of the fluid lines 13.

Figure 2:
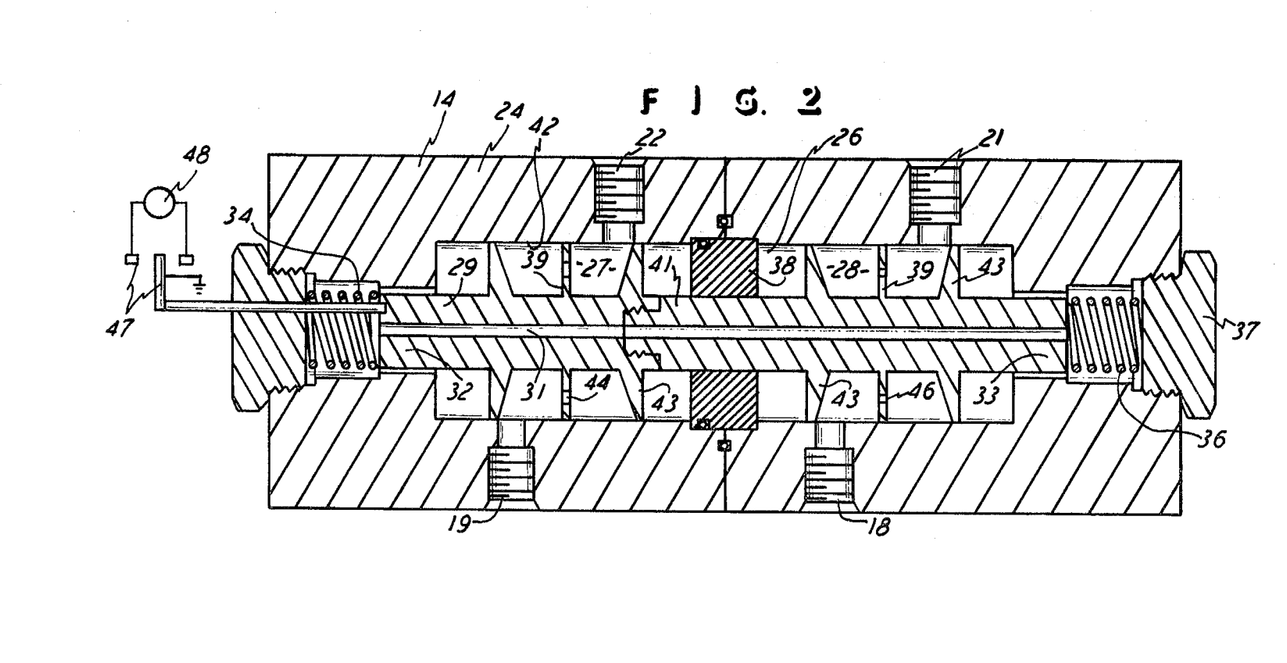
FIG. 2 is an enlarged sectional view of a protective valve utilized in the system of this invention.

FIG. 2 shows the details of the protective valve 14, and it will hereby be seen that the valve includes a valve body 24 having a central compartment 26 which is divided into two compartments 27 and 28 at opposite ends of the body 14, in a conventional arrangement. The valve ports 18, 19, 21, and 22 are shown as threaded openings extended into the interior compartment described, and thus fluid will flow into and out of the interior compartment where an axially movable valve spool 29 is disposed. The spool 29 is longitudinally shaped and has a fluid passageway 31 extending along its longitudinal axis, and thus fluid can flow between opposite ends 32 and 33 of the spool 29. Also, compression springs 34 and 36 are in abutment with the spool ends 32 and 33 and thus the springs serve to center the spool 29 when fluid pressure is not acting unbalanced on the spool 29. End plugs 37 thread into the valve body 24 to close off the interior chamber at those locations.

Also, the valve has a center piece 38 which divides the valve into the two compartments 27 and 28, and the spool 29 will slide through the partition 38 in the aforesaid axial movement of the spool 29. Thus, the ports 18 and 21 form a pair of ports, and the ports 19 and 22 form another pair of ports, and it will be noted that the ports are offset or spaced apart along the length of the valve body 24, as shown in FIG. 2.

The spool 29 has two projections 39 thereon, and these projections are in the form of circular plates extending radially from the spool body 41 and extending circularly therearound to be in sliding but fluid tight contact with the cylindrical wall 42 defining the compartment 26. Also, the spool 29 has four additional circular plate-like members 43, with two thereof being in each of the compartments 27 and 28, and these portions 43 are circular and extend to the same radius as the projections 39 and the portions 43 are in fluid-tight sliding contact with the cylindrical wall 42 defining the compartment 26. Thus the projections 39 and the portions 43 are circular and plate-like in shape and are all integral with the spool body 29 and extend radially therefrom to the same extent to be in fluid-tight and sliding contact with the cylindrical wall 42 of the valve body 24.

Further, the projections 39 are disposed to be intermediate the two ports of each pair of ports, such as the projection 39 on the left in FIG. 2 is disposed between the ports 19 and 22. Still further, the projections 39 have a plurality of orifices or fluid passageways 44 extending therethrough, and thus fluid can flow through the orifices 44 and between the two ports in each pair of ports, such as flow going from the port 19 and through the orifices 44 and to the port 22. Actually, the orifices in the projection 39 on the right in FIG. 2 are designated 46 since they are smaller than the orifices 44 in individual size and in total flow through the respective orifices 44 and 46. The reason is that the orifices 46 are subjected to the flow through the two ports 18 and 21 in that pair of ports, and those ports are in fluid-flow communication with the rod end of the assembly 17, and thus there is less flow in those ports than in the ports 19 and 22 which are in fluid-flow communication with the head end of the assembly 17.

It will also be noticed that the portions 43 are disposed on opposite sides of each of the respective pair of ports, rather than intermediate the two ports in each pair of ports as in the case with the projections 39.

During normal operation of this fluid system, the flow to or from the rod end of the assembly 17 is in a fixed proportion to the flow to or from the head end of the assembly 17. If a fluid line ruptures, the valve 14 senses that the flows are no longer in that fixed proportion, and the spool 29 will thus shift to block flow to or from either end of the assembly 17. Thus, the orifices 44 and 46 are of a size to be in the same ratio as the head end and rod end of the assembly 17 with regard to their fluid flow and displacement. Accordingly, during normal operation, the fluid pressure drop through the orifices 44 and 46 is the same, and thus the forces generated by the fluid act in opposite directions and are balanced relative to the spool 29, and thus the spool 29 will not move axially.

Next, if one of the fluid lines were to rupture, then the fluid flow as described above would no longer be in the same ratio as the cylinder assembly head and rod end areas. Accordingly, the system in FIG. 1 is arranged such that if there is a leak in the system it is likely to occur in the lines or hoses 13, and the protective valve 14 is disposed closest to the fluid motor or cylinder assembly 17, and the lines 16 are preferably not of a nature which will encounter a rupture or leak. Therefore, assuming that the work load acts to contract the cylinder assembly 17, and further assuming that the control valve 12 is in a neutral position, there will be no flow of fluid to the port 18. However, if the line 13 leading to the port 19 breaks, there will be work-load induced flow of fluid into the port 22 and out the port 19, and that flow will go through the orifices 44 creating a pressure drop across the projection 39. Since there will be no flow through the orifices 46, there is no pressure drop there, and the pressure drop through the orifices 44 will act on the projection 39 to move the spool 29 to the left in FIG. 2. The closure 43 adjacent the port 22 will thus move across the port 22 and block flow to the port 19. The desired consequence is that there will be no flow from the head end of the assembly 17, and thus the load will be held in a static condition, as desired. The spool 29 will remain shifted to the left, as described, until the pressure at the port 22 is removed, and at that time the centering springs 37 will reposition the spool 29 for normal action.

Also, in the above situation, if the control valve 12 were in a position of supplying fluid to the port 18, rather than in the neutral position described, the spool 29 would still shift as described, providing the fluid flow out of the assembly 17 was some amount above a normal flow. The exact amount above normal flow required to shift the spool 29 is determined by the centering spring preload and by the sizing of the orifices 44 and 46. Also, if the work load were acting to extend the assembly 17, rather than contract it as described above, the flow from the port 21 to port 18 would be generated by the load and would shift the spool to the left if there were a leak in the line 13 leading to the port 18. In that instance, the right-hand one of the closures 43 would block off the port 21 and block the flow from the assembly 17, as desired.

In the situation where the work load acts to extend the assembly 17 and there is a leak in the line 13 leading to the port 19, the spool 29 would not shift if the control valve 12 were in a neutral position. That is, the control valve 12 would hold the assembly 17 at rest by not allowing flow from the rod end of the assembly 17. However, as soon as the control valve 12 is shifted to direct the flow from the pump 10 and into the line 13 leading to the port 18, the control valve also would open to allow return flow from the rod end of the assembly 17 to flow through the port 18, through the control valve 12 and out the return port of the control valve. There is work-load induced return flow even though all the pump flow is being spilled out through the leak in the line 13 connected with the port 19. The flow from the port 21 to the port 18 passes through the orifices 46 creating a pressure drop. Since there is no flow from the port 19 to the port 22, there is no pressure drop through the orifices 44 and there is an unbalanced force on the spool 29 shifting it to the left. The closure 43 thus seals off the port 21 locking the assembly 17 in place.

Figure 3:
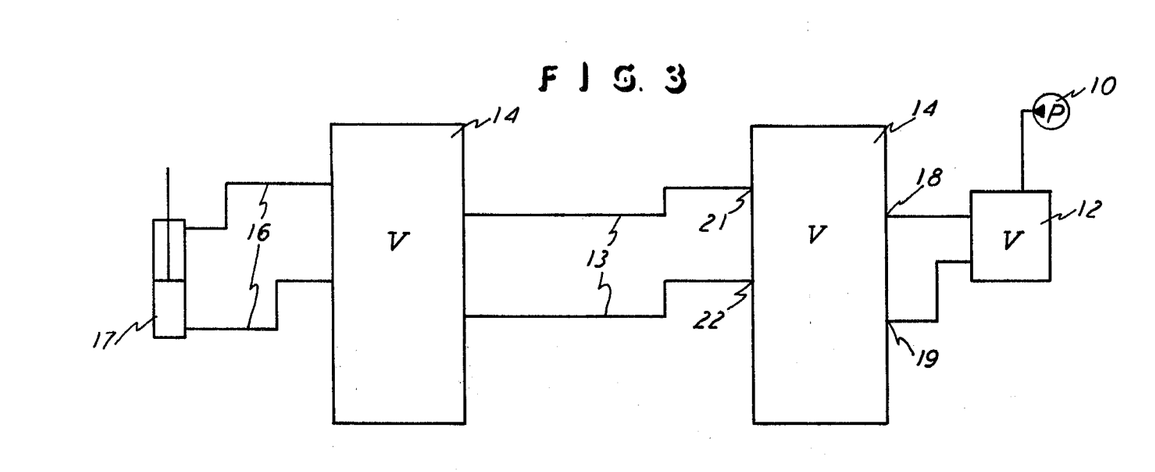
FIG. 3 is a diagrammatic view of another embodiment of a fluid system assembly of this invention.

In the above-mentioned situation, the use of two protective valves 14 will protect the assembly 17 from runaway operation and stop leakage from the system. The arrangement of the system with two protective valves 14 is shown in FIG. 3.

After the valve 14 adjacent the assembly 17 has shifted to block the load-induced flow from the assembly 17 as described above, the pump flow would all be going out the leak in the line 13. Thus, the valve 14 near the control valve 12 has flow in port 19 and out port 22 but has no flow in at port 21 because the protection valve 14 near the assembly 17 has already shifted. The pressure drop across orifices 44 of the valve 14 near the control valve 12 are not balanced by a pressure drop across the orifices 46 and thus the spool 29 shifts with the closure 43 shutting off the port 19 and stopping flow from the control valve 12. The spool will remain shifted as long as port 19 is pressurized, and it will shift again whenever the control valve 12 is shifted to send more than a minimum flow of fluid to the assembly 17. The exact amount of flow needed to shift the spool 29 is determined by the size of the orifices 44 and the force of the spring 36.

In the situation of the work load acting to contract the assembly 17, and there being a leak in the line 13 leading to the port 18, the situation is similar to that just described. With the valve 12 closed, the cylinder assembly 17 is locked in place by oil trapped in the line 13 connected with the port 19. As soon as the valve 12 shifts, fluid flows through the port 19 and out the return port of the valve 12. Since the line at the port 18 is leaking, no flow goes into the port 18. The spool 29 would shift and lock the assembly 17 in place by blocking the flow into the port 22. In the system with two protection valves 14, the valve 14 near the control valve 12 then has flow in at the port 18 and out at the port 21 but no flow in at the port 22. This condition causes the spool 29 to shift and block off flow from the control valve 12 and stop the leakage.

There could also be a switch in operative communication with the spool 29 to detect the position of the spool 29, and there could be a signal associated with the switch, in the form of a buzzer or a warning light, such as shown by the switch designated 47 and the signal 48, and the operator can therefore know the position of the spool 29 and thus be aware of the conditions in the entire fluid system, as described above.

Figure 4:
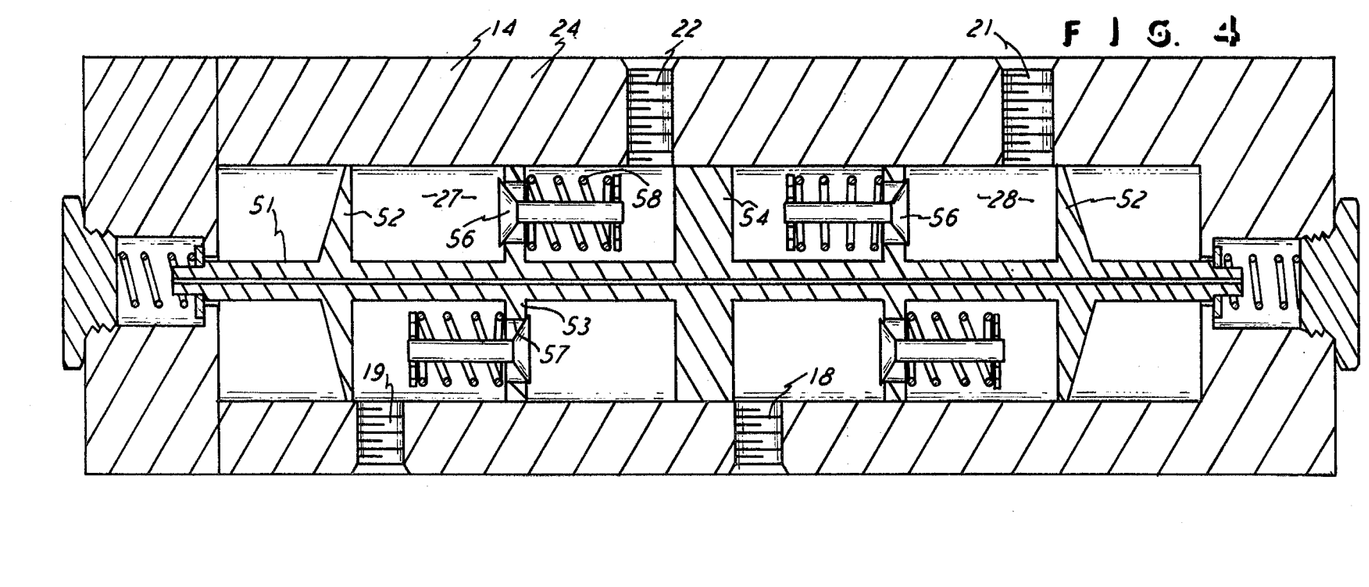
FIG. 4 is an enlarged sectional view of a protective valve utilized in the fluid system assembly of this invention.

The valve 14 may also be constructed to utilize check valves, and FIG. 4 shows that arrangement where the valve has a spool 51 of a longitudinal construction having the radially extending closure portion 52 on opposite ends thereof and having the radial projections 53 thereon and having a center piece 54 which pilots the sliding of the spool in the two compartments 27 and 28 defined by the central projection 54. In that embodiment, check valves 56 are disposed on the fluid passageways 57 in the projection 53, and these check valves have springs 58 urging them to closed position relative to the openings 57, as shown. As such, the check valves 56 function as low pressure relief valves. When fluid is flowing in either direction through the passageways 57, a pressure drop is created in the direction of the flow and the pressure drop acts on the projection 53 and thus creates the axial or longitudinal force on the spool 51, as described in connection with FIG. 2. During normal operation, whenever flow is from port 18 to port 21 it is also from port 22 to port 19 and thus the force acting on the projections 53 is equal and opposite and there is therefore no net force on the spool 51 and no shifting thereof.

However, when there is no flow between the ports 18 and 21 but if there is flow between the ports 22 and 19, or vice versa, there is pressure across one of the projections 53 but not across the other, and this will shift the spool 51, as described above.

Beyond the aforesaid, the various situations with regard to the loading of the assembly 17 and the assumption of leaks in either of the lines 13 can be analyzed and traced as they are in regard to the valve 14 as shown in FIG. 2. However, the utilization of spring-loaded check valves 56 effects the operation somewhat differently than does the valve shown in FIG. 2 but the basic function is similar. It will of course be noticed that the check valves 56 are disposed in opposite directions on the projections 53, and the effect and strength of the springs 58 will of course effect the action of the valves 56 and thus the pressure drops across the projections 53.

Figure 5:
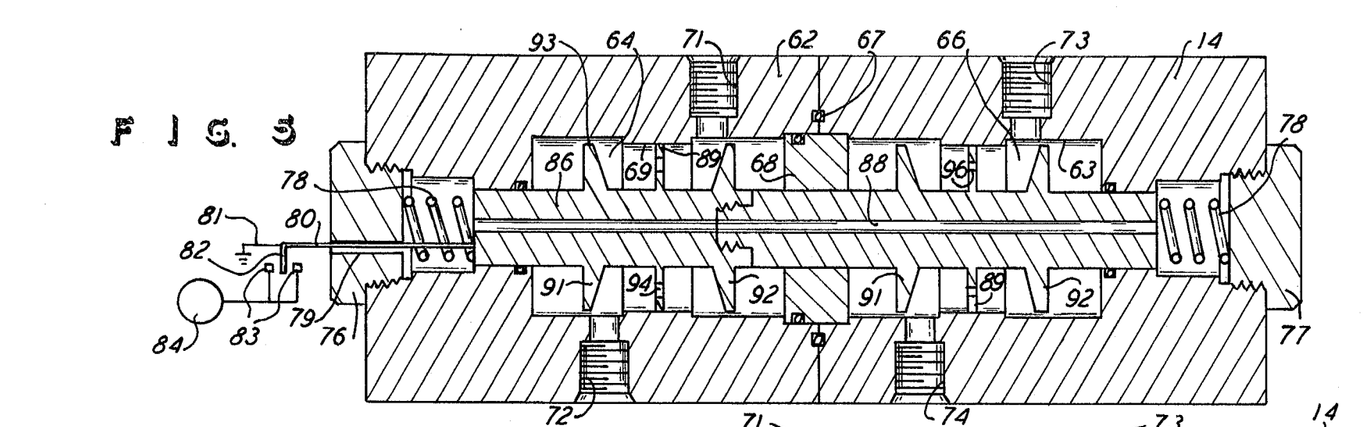
FIGS. 5 and 6 are enlarged sectional views of protective valves utilized in the fluid system assembly of this invention.
Figures 6, 7:
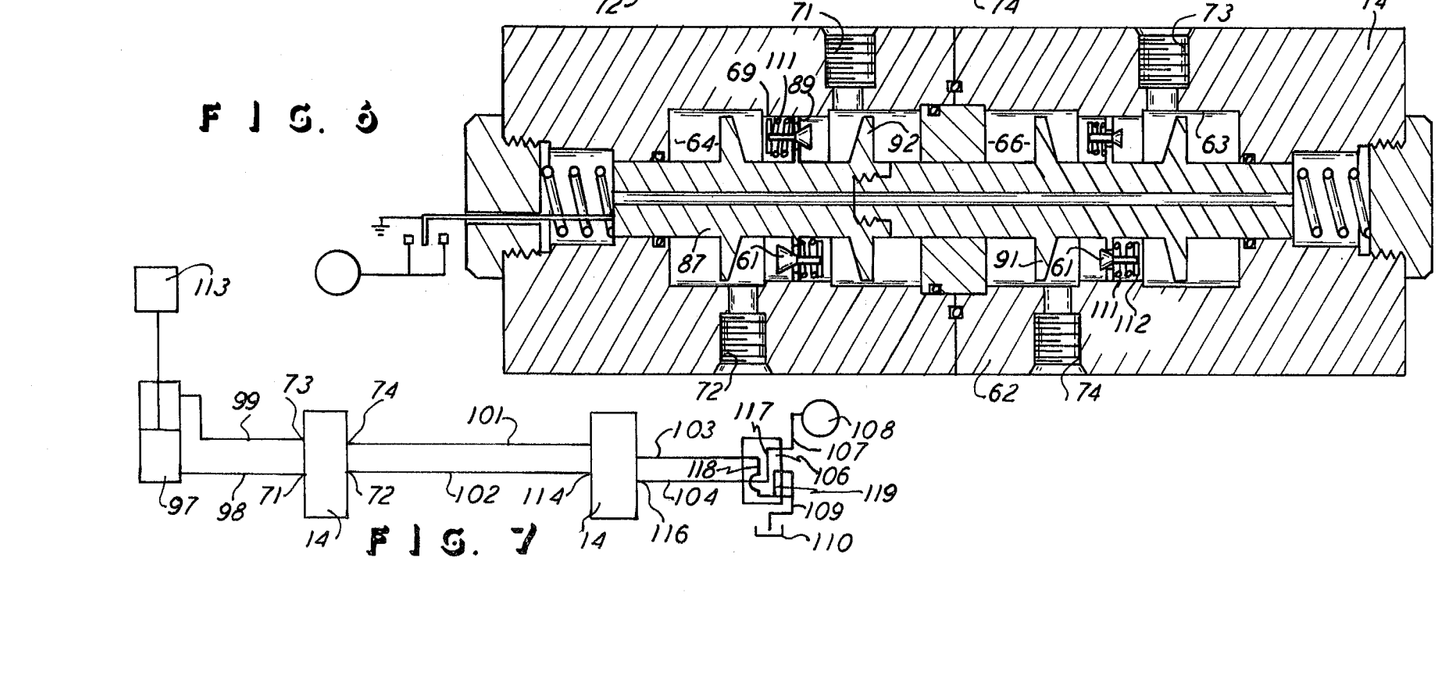
FIG. 7 is a diagrammatic view of an embodiment of a fluid system assembly of this invention.

FIGS. 5 and 6 show a somewhat different embodiment of the invention, and here it will be noted that the protective valves 14 have different interiors and different shapes of valve spools. The valves 14 in FIGS. 5 and 6 are similar to each other except for the utilization of the check valves 61 in FIG. 6, as explained hereinafter. Thus, the valves in FIGS. 5 and 6 each have a body portion 62 and an interior cylindrically shaped chamber 63. Each chamber 63 is divided into two compartments 64 and 66 which are identical in configuration, as shown. The valve body 62 exists in two halves, and a fluid seal member 67 extends between the halves for sealing them together, and the two halves would of course be joined together in any conventional manner. Also, a cylindrical block 68 is interposed between the two valve body halves, and the block 68 provides a fluid-type partition with the valve body 62 and for defining the valve compartments 64 and 66.

Each valve body 62 has a cylindrical surface 69 in each of its two compartments 64 and 66, and the surface 69 is on a diameter less than the diameter of the adjacent cylindrical portion of the valve body interior chamber 63, as shown. Also, the two cylindrical surfaces 69 in each of the valve bodies 62 is located intermediate the axial length of each compartment 64 and 66, and the location is also intermediate valve ports 71 and 72, on the left compartment 64 and intermediate valve ports 73 and 74 on the right compartment 66. These four ports extend into the valve bodies as fluid passageways and are thus in fluid-flow communication with the valve chamber 63, as shown, and it will also be seen that the respective valve ports or passageways described are axially offset or staggered so that fluid cannot flow in one direct line transverse to the longitudinal axis of the valve 62 and between any two of the ports or passageways described.

The opposite ends of the valve bodies 62 have nuts 76 and 77 fluid tightly threaded therein, and these nuts provide backing for compression springs 78 which extend between the respective nuts and the opposite ends of the shown spools disposed within the valve body 62. Also, the nut 76 has an opening 79 which receives a member 80 extending through the nut 76 and in contact with the end of the respective spool in the valve, and the member 79 also connects with an electric ground wire 81 and has an offset portion 82 which can move between two electric contacts 83 connected with an electric signal, such as a light or buzzer designated 84 and of a conventional arrangement, and this is in the nature of the arrangement shown on the left end of FIG. 2.

Thus each protective valve 14 has its respective spool, designated 86 and 87, axially movably disposed within the valve body 62 and centered therein by means of the spring 78 at each end of each spool. The spool forms a valve closure and each spool has a central passageway 88 extending therethrough for balancing fluid pressures on the opposite ends of the spools. Each spool has a radial projection 89 and it has a radial closure portion 91, with the projection and portion each being cylindrically shaped and integral with the spool and extending radially therefrom, as shown. It will be further noted that there is one projection 89 in each valve compartment 64 and 66, and there are two closure portions 91 and 92 in each of the valve compartments. Further, the closure portions 91 and 92 are spaced apart and are spaced from and are on opposite sides of the projection 89. Still further, in the centered position for the spools, the closure portion 92 is to one side of the ports 71 and 72, and the closure portion 91 is to the opposite side of the ports 71 and 72, and the same is true for the compartment on the other end since each valve is arranged with identically opposite end compartments and the spools are also identical at their opposite ends. The portions 91 and 92 are preferably circular and are of an outer diameter such that the outer surfaces 93 have a circumference equal to the circumference of the valve body surface 69, the arrangement being such that when the spool shifts axially so that either portion 91 or 92 is aligned with the surface 69, then the portions 91 and 92 fluid seal with the surface 69 so that no fluid will pass the portions 91 and 92 in that spool shifted position mentioned.

The projections 89 have orifices 94 and 96, respectively, and it will be noted and understood that the orifices 94 are of a larger size than the orifices 96, and there are a plurality of orifices on each projection 89 and the total area of the orifices 94 is greater than the total area of the orifices 96 for the respective flow of fluids through the orifices 94 and 96. Further, as mentioned in connection with the previously described figures, the fluid motor, in the form of the cylinder assembly 97 in FIG. 7 has a demand or requirement for the flow of fluid of two different fluid capacities, and that is the capacity required by the conventional head end of the assembly 97 and the conventional rod end of the assembly 97. Of course the requirement for the rod end is less than that for the head end of the assembly 97, due to the presence of the rod in the rod end. Likewise, the total area of the respective orifices 94 and 96 are in proportion to the two fluid flow capacities of the assembly 97, as shown and as mentioned, and thus the ports 73 and 74 which are in fluid-flow communication with the smaller orifices 96 are connected with the lower fluid flow capacity of the assembly 97, namely the rod end of the assembly 97. Of course the larger fluid flow capacity through the larger orifices 94 is supplied by the ports 71 and 72 which are connected with the head end of the assembly 97 and that is through the hose or fluid line 98, while the hose or fluid line 99 connects the rod end with the protective valve 14. Thus, the projections 89 are fluid tight with the valve body cylindrical surfaces 69 at the point of contact therebetween, and fluid will only flow through the respective orifices 94 and 96. However, as mentioned, fluid can flow past the closure portions 91 and 92 unless the closure portions are aligned with or in contact with the cylindrical surfaces 69, respectively.

FIG. 7 further shows there are two protective valves 14, and there are two other lines or hoses 101 and 102 connecting the two valves 14, and there are other hoses or lines 103 and 104 which connect the valve 14 with a control valve 106 which is of a conventional construction, and a hose or line 107 connects the valve 106 to a fluid pump 108. There is also a line designated 109 which extends to a reservoir 110, all in a conventional arrangement with respect to the valve 106 and pump 108 and the reservoir 110.

As mentioned, the spools 86 and 87 are identical except for portions which are shown as valve closures 61 in FIG. 6. These closures 61 are movably disposed on the projections 89 and extend through the respective orifices 94 and 96 and have compression springs 111 which urges the respective closures 61 into fluid tight seating position on the projections 89 to thereby preclude the flow of fluid through the orifices 94 and 96. Pins or securing members 112 are also connected with the closures 61 to secure the springs 111 between the pins 112 and the projections 89, as shown. It will be further seen that the valves or closures 61 are conically shaped and are oppositely disposed in equal numbers of an even number of say four or six valve 61 extending around the respective projection 89. With that arrangement, flow can go through the orifices 94 and 96 in both directions by pressurizing the valve 61 which will move off its seated position on the projection 89 such as when flow is going from port 72 to port 71 and thus moving the upper closure 61 to the right, as viewed in FIG. 6, and thus off its seated position on the projection 89 to thereby open the respective orifice 94 through which the closure 61 is extending. Conversely, when flow is in the opposite direction, then the other one half of the number of closures 61 will move to the left for permitting flow therethrough, such as with respect to the closure 61 in the bottom half, as viewed in FIG. 6. In this manner, the valve 14 as constructed in FIG. 6 can be used for two-way flow as the protective valve of this invention. Further, with the provision of the spring loaded check valves 61 there is a constant fluid pressure drop through the check valve and over a wide fluid-flow range. This is true because of the pressure required for opening the valve 61 against the force of the spring 111 and for then holding it open. Therefore, the effect on the performance of the protective valve is such that the flow ratio between the supply and return oil can vary greatly, without shifting the spool to where it will shut off all flow. However, when flow is absent in one passageway of the four passageways described, then there will be an unbalanced force on the spool and the spool will then shift and shut off the flow as desired.

Accordingly, the spool of FIG. 6 is less sensitive to pressure variations, but the spool will shift to the shut off or closed position when there is a sufficient pressure drop differential across the projections 89, such as that caused by a complete leak in the lines at those designated 101 and 102.

The exact sizes of the orifices 94 and 96 are thus dependent upon the two flow capacities of the fluid motor 97, as mentioned, and also the springs 78 affect that consideration. Further, the spools are fluid tight with the center partitions 68 where the spools pass therethrough. The opposite ends of each spool can be open to atmospheric pressure, such as permitted by the passageway 79 and the center bore 88 in the spool itself, and thus the spools are not subject to any fluid pressures at the opposite ends thereof.

During normal operation, the fluid flows are determined by the cylinder assembly 97 and its requirements, so that fluid pressure drop across the orifices 94 and 96 are equal, and thus the forces on the spool are balanced and the spool is in the centered position, as shown in FIGS. 5 and 6. When a leak occurs in one of the hoses or lines, the flow ratio is no longer the normal fixed value, and the pressure drops across the orifices 94 and 96 is therefore unbalanced, and the spool will then shift to shut off the fluid flow. Several conditions of improper or unbalanced fluid flow will move the spool in the protection valve. For instance, FIG. 7 shows there is a load 113 supported by the assembly 97 and acting to contract the assembly 97 and thereby place fluid pressure in the line 98 and also in the line 102. That means that the pump 108 and the valve 106 are acting to present fluid pressure to the line 102 for supporting the load 113. If there is a break in the line 102 and the fluid leaks therefrom, without the protection valve the load 113 would fall out of control, but the protection valve 14 prevents that by shutting off in response to sensing the leak in the line 102. That is, line 101 is connected to the tank or reservoir 110 through the conventional valve 106, and the load acts to draw fluid into the rod end of the assembly 97. However, due to the restriction of the orifices 96, cavitation occurs and there is little or no flow through the orifices 96. The absolute maximum pressure drop across the orifices 96 is limited to one atmosphere plus any return line pressure from the hydraulic control valve 106 to the tank or reservoir 110.

However, the pressure drop across the orifices 94 is limited only by the pressure generated by the load, which is considerably greater than one atmosphere. Thus, as soon as the leak occurs in the line 102, the load causes flow through the orifices 94, and that flow is not balanced by a corresponding pressure drop across the orifices 96, and thus the spool will shift to the left, as viewed in FIG. 5, until the closure portion 92 is substantially to the left of the passageway 71. That is, the pressure drop across the projection 89 overcomes the spring 78 on the left of the spool and causes the spool to shift to the left. As this occurs, the closure portion 92 approaches the closure surface 69 and commences to restrict the oil flow from the port 71 to the port 72. Eventually the fluid pressure on the right side of the closure 92 will further shift the spool to the left to where the closure portion 92 is fully on the closure surface 69 and is thus restricting the flow from the passageway 71 and to the passageway 72, and thus there can be no flow leaking through the line 102 from the valve 14 and as caused by the load 113 acting on the assembly 97. The spool is held in that closed position, by means of the fluid forces induced by the load 113, as explained, and thus the load 113 will not fall and the closed condition will prevail until the line 102 is repaired and fluid pressure is balanced across the projection 89 and the both sides of the closure portion 92.

Of course in the condition mentioned where the pump 108 is pressurizing the line 102, the flow from the pump would go through the leak in the line 102, except for the presence of the additional protective valve 114 between the line 102 and the pump 108, as shown in FIG. 7. Thus the valve 14 on the left in FIG. 7 protects against runaway load, and the valve 14 on the right in FIG. 7 protects against the loss of fluid in the line 102, and that is accomplished by having the valve 14 on the right operate as explained in connection with the valve shown in FIG. 5 so that the port 114 is closed relative to the port 116, all be means of the arrangement of the valve 14 and the fluid pressure drop through the valve, as explained in connection with the valve in FIG. 5 which is the type of valve shown on the right hand side in FIG. 7.

Accordingly, the disclosures between FIGS. 1 through 4 are the equivalent of the disclosures in FIGS. 5 through 7 except for the provisions of the lands or circular surfaces 69 and the matching circular surface 93 on the closure portions 91, as shown in FIGS. 5 and 6. Thus, in FIGS. 5 and 6, both the closure portions 91 and 92 are matched with the land 69, in each compartment 64 and 66, and therefore both closures 91 and 92 will fluid tightly seal with the closure surface 69 when the spool 86 shifts to the left or to the right, respectively such that either closure portion 91 or 92 aligns with the closure surface 69.

One skilled in the art will understand that the control valve 106 is an open center valve such that in the neutral condition the pump flow is moving directly through the valve and to the line 109. In that condition, the load 13 can be creating pressure in the lines 98 and 102, and the valve 106 is holding that pressure so that the load 113 is supported. Next, if there is a leak say in the line 102, then there will be lower pressure in the line 102 compared to the line 98, and that will activate the protective valve as described in the foregoing. Thus the valve spool 86 or 87 will shift to the left and interrupt the flow from the passageway 71 and to the passageway 72 by means of the closure portion 92. In that situation, it can also be assumed that the valve 106 is still in the neutral position, and then the lines 99, 101, and 103 will be subject to static fluid pressure conditions and will have the void, due to cavitation as mentioned, and there may thus be only three psi absolute pressure, for instance, in those lines.

Next, with the control valve 106 set in a position which will pressurize lines 104 and 102 and 98, all to lift the load 113, there will be high pressure in the lines just mentioned. Also, return line 99 may have a pressure of say 110 psi and return line 101 may have a pressure of say 50 psi, due to the pressure drop through the protective valve 14 on the left, and there will also be another pressure drop between lines 101 and 103, due to the protective valve 14 on the right in FIG. 7. In that instance, there will be a fluid passageway 117 in the valve 106 in fluid-flow communication between the pump line 107 and the line 104, and there will also be a fluid passageway 118 in the valve 106 in fluid-flow communication between the line 103 and the line 109.

Finally, in the event that line 102 develops a leak while that line is being supplied by pressurized fluid from the pump 108, as previously mentioned, then the pressure in line 102 will drop below a value of the pressure in the line 98, and that will cause the valve 14 on the left to close, as mentioned. Again, the lines 99 and 101 are subject to suction or cavitation due to the movement of the piston in the assembly 97, and thus those lines will have an absolute pressure of 15 psi, for instance, and a small amount of oil will actually be sucked through those lines and into the cavitating assembly 97. Accordingly, the protective valves 14 will operate as described and respond only to breaks in the lines disclosed, and there will actually be some gauge pressure, say 3 psi, in the lines opposite those being pressurized during the normal use of the system, and thus the protective valves operate only in response to a break in one of the lines. Also, in the neutral position for valve 106, the loop passageway 119 would connect between the lines 107 and 109, in a conventional schematic arrangement, as shown.

What is claimed is:

1. A protective fluid system comprising a fluid pump and a fluid control valve and a fluid protective valve and a fluid motor means, all fluid-flow connected together with fluid lines and having said protective valve positioned closest to said fluid motor means and said fluid control valve being positioned between said pump and said fluid protective valve, said fluid motor means having two fluid-flow capacity requirements respectively with each separately fluid-flow connected with said protective valve, said protective valve having a valve body with two fluid-flow separated compartments, an elongated valve spool disposed in said valve body and having each end extending into a respective one of said compartments and being axially movable therein, each end of said spool having two fluid-flow closure portions thereon and also having a projection interposed between said two closure portions with fluid-flow orifices extending through said projections in the longitudinal axial direction of said spool, spool-centering springs in said valve body and acting on said spool for positioning said spool in a centered position to have fluid flow between said passageways in each of said pair of passageways, said orifices in said respective projections being of a total fluid-flow capacity equally proportioned relative to said two fluid-flow capacity requirements of said motor means to effect equal fluid pressure drop through said respective orifices when said motor means is experiencing fluid flow of its said two fluid-flow capacity requirements, said body having a pair of fluid-flow passageways extending into each of said two compartment and with the latter said passageways being spaced apart on said body in the longitudinal axial directions of said spool, said projections disposed on said spool to be positionable intermediate said passageways of each said pair of passageways and have said orifices respectively receive all the flow of fluid between said passageways in each said pair of passageways, said closure portions on each end of said spool disposed on said spool to be respectively positionable to one side of each of said pairs of passageways, in one axial position of said spool for the flow of fluid between said passageways in each of said pair of passageways and through said orifices, and to be respectively positionable between said passageways in each of said pair of passageways, in another axial position of said spool, to block the flow of fluid between said passageways in each of said pair of passageways, whereby an unequal fluid pressure drop through said orifices and thus on oposite sides of said projections axially shifts said spool for the blocking of fluid flow, said fluid control valve being of a type to create fluid back pressure in said fluid line connected therewith, whereby opening of said fluid control valve does not simulate a break in said fluid line to trigger said protective valve, and said protective valve being operable for blocking of fluid flow for breaks in said fluid line which do not effect a back pressure therein.

2. The protective fluid system as claimed in claim 1, wherein said fluid motor means is a fluid cylinder capable of supporting a load and thereby creating a fluid pressure at one of said passageways in said protective valve.

3. The protective fluid system as claimed in claim 1, including two of said protective valves fluid-flow connected intermediate said control valve and said fluid motor means, for blocking flow of fluid through any of said fluid lines in the event of a leak in said fluid lines.

4. The protective fluid system as claimed in claim 1, wherein said closure portions are in pairs and one of said projections is disposed between the two said closure portions in each said pair of closure portions, and said closure portions and said passageways being identically disposed relative to each other in comparison between said compartments.

5. The protective fluid system as claimed in claim 1, including spring-loaded check valve closures operative on said orifices for effecting a low pressure relief valve at said orifices.

6. The protective fluid system as claimed in claim 1, including an electric switch operatively associated with said spool to be actuated by the axial movement of said spool, and an electric signal connected with said switch for signalling the axial position of said spool and to thereby notify the operator as to the leakage in said lines.

7. The protective fluid system as claimed in claim 1, wherein said closure portions are positioned at the edge of the respective some of said passageways in the spool-centered position created by said springs.

8. The protective fluid system as claimed in claim 1, wherein said two fluid-flow capacity requirements of said motor means are different from each other, and said total fluid-flow capacities of the respective said orifices are different from each other and are respectively equal to the fluid-flow capacity requirements of said motor means.

9. The protective fluid system as claimed in claim 1 or 4, wherein said valve body has fluid-flow shut-off surfaces, said closure portions being positioned on said spool spaced from said shut-off surfaces when said spool is in said one axial position, and said closure portions being positioned on said spool to be alternately on said shut-off surfaces in other axial positions of said spool for blocking fluid flow.

10. The protective fluid system as claimed in claim 9, wherein said closure portions are in pairs and one of said projections is disposed between the two said closure portions in each said pair of closure portions, and said closure portions and said passageways being identically disposed relative to each other in comparison between said compartments.

11. The protective fluid system as claimed in claim 10, wherein said closure portions are cylindrical and project radially on said spool, and said shut-off surfaces are radially inwardly disposed cylindrical surfaces of diametrical sizes to fluid-tightly mate with said closure portions.

12. The protective fluid system as claimed in claim 1 or 4, wherein said valve body has fluid-flow shut-off surfaces, said closure portions being positioned on said spool spaced from said shut-off surfaces when said spool is in said one axial position, and said closure portions being positioned in said spool to be alternately on said shut-off surfaces in other axial positions of said spool for blocking fluid flow, and including spring-loaded check valve closures operative on said orifices for effecting a low pressure relief valve at said orifices.

13. The protective fluid system as claimed in claim 12, including an electric switch operatively associated with said spool to be actuated by the axial movement of said spool, and an electric signal connected with said switch for signalling the axial position of said spool and to thereby notify the operator as to the leakage in said lines.

14. The protective fluid system as claimed in claim 1, wherein said fluid control valve is of an open center type and is arranged with fluid passageways for creating said fluid back pressure in the return passageway when said control valve is in the operative position.

* * * * *